US009267542B2

(12) United States Patent
Scheibe et al.

(10) Patent No.: US 9,267,542 B2
(45) Date of Patent: Feb. 23, 2016

(54) SYSTEM OF SLIDING ELEMENTS

(75) Inventors: Hans-Joachim Scheibe, Dresden (DE); Michael Leonhardt, Grünbach (DE); Andreas Leson, Dresden (DE); Werner Hufenbach, Dresden (DE); Manuela Andrich, Dresden (DE); Klaus Kunze, Dresden (DE)

(73) Assignees: Fraunhofer-Gesellschaft zur Förderung der angewandten Forschung e.V. (DE); Technische Universität Dresden (DE)

( * ) Notice: Subject to any disclaimer, the term of this patent is extended or adjusted under 35 U.S.C. 154(b) by 0 days.

(21) Appl. No.: 14/008,806

(22) PCT Filed: Mar. 28, 2012

(86) PCT No.: PCT/EP2012/055473
§ 371 (c)(1),
(2), (4) Date: Dec. 17, 2013

(87) PCT Pub. No.: WO2012/130865
PCT Pub. Date: Oct. 4, 2012

(65) Prior Publication Data
US 2014/0093196 A1 Apr. 3, 2014

(30) Foreign Application Priority Data
Apr. 1, 2011 (DE) .......................... 10 2011 016 611

(51) Int. Cl.
*F16C 33/18* (2006.01)
*F16C 33/20* (2006.01)
(Continued)

(52) U.S. Cl.
CPC ................. *F16C 33/043* (2013.01); *C08J 5/10* (2013.01); *C08J 5/24* (2013.01); *F16C 3/026* (2013.01);
(Continued)

(58) Field of Classification Search
CPC ............... F16C 33/043; F16C 2206/04; F16C 2206/06; F16C 2208/02; F16C 2208/04
USPC ............. 384/276, 625, 42, 297–300; 428/408
See application file for complete search history.

(56) References Cited

U.S. PATENT DOCUMENTS 4,623,590 A * 11/1986 Hodes et al. ................... 428/408
5,234,752 A * 8/1993 Laflin et al. ................... 442/191
(Continued)

FOREIGN PATENT DOCUMENTS

CH 613467 A5 9/1979
DE 8601948 U1 7/1989
(Continued)

OTHER PUBLICATIONS

"International Application No. PCT/EP2012/055473, International Search Report and Written Opinion mailed May 30, 2012", 14 pgs.
(Continued)

*Primary Examiner* — Phillip A Johnson
(74) *Attorney, Agent, or Firm* — Schwegman Lundberg & Woessner, P.A.

(57) ABSTRACT

The invention relates to a system of sliding elements which are formed by a base body and a counter-body. It is the object of the invention to provide a system of sliding element comprising a base body and a counter-body which has a reduced mass with a sufficient strength and which achieves improved properties of friction and wear. The system of sliding elements in accordance with the invention is formed by a counter-body and a base body as friction partners. The base body is formed from a fiber-reinforced polymer material and the counter-body is coated with diamond-like carbon at the surface subject to friction. At least the base body is formed from a textile-reinforced polymer matrix structure.

12 Claims, 3 Drawing Sheets

Figure 1:
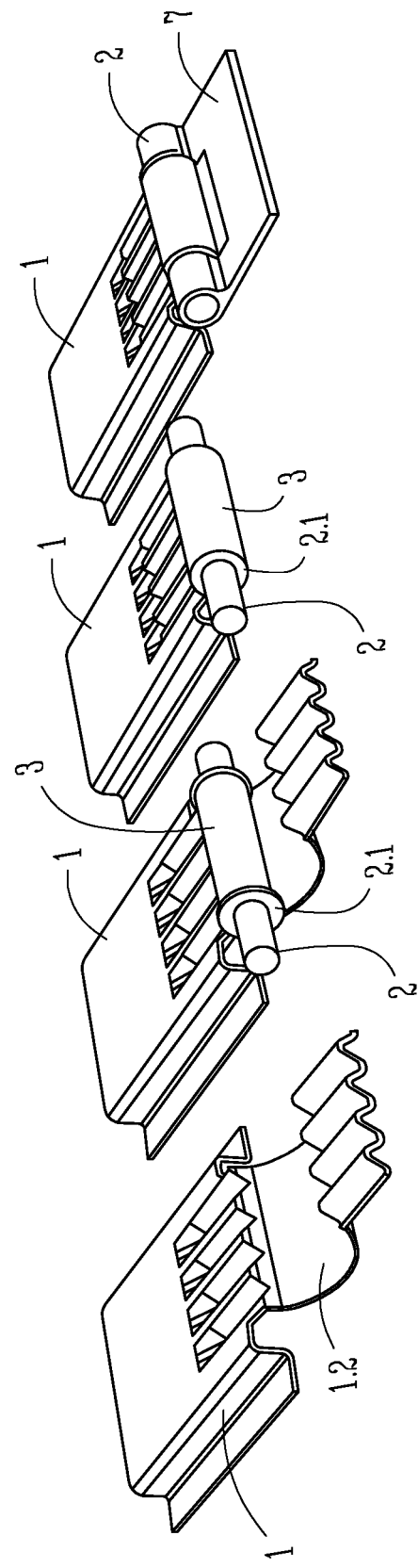

(51) Int. Cl.
    *F16C 33/04*    (2006.01)
    *C08J 5/10*     (2006.01)
    *C08J 5/24*     (2006.01)
    *F16C 3/02*     (2006.01)
    *F16C 3/035*    (2006.01)
    *F16H 55/06*    (2006.01)

(52) U.S. Cl.
    CPC .............. *F16C 3/035* (2013.01); *F16C 33/201* (2013.01); *F16C 2206/04* (2013.01); *F16C 2350/54* (2013.01); *F16H 55/06* (2013.01)

(56) References Cited

U.S. PATENT DOCUMENTS

| | | |
|---|---|---|
| 6,533,908 B1 | 3/2003 | Meyer et al. |
| 6,676,296 B2 | 1/2004 | Inoue et al. |
| 7,703,983 B2 * | 4/2010 | Tsutsui et al. .............. 384/279 |
| 2004/0031624 A1 * | 2/2004 | Scott et al. ................. 175/371 |
| 2007/0204880 A1 | 9/2007 | Weihnacht et al. |
| 2007/0209934 A1 | 9/2007 | Meyer |
| 2008/0240634 A1 | 10/2008 | Laal Riahi et al. |
| 2009/0060408 A1 | 3/2009 | Nagasaka et al. |
| 2009/0286064 A1 * | 11/2009 | Endo et al. ................. 428/299.1 |

FOREIGN PATENT DOCUMENTS

| | | |
|---|---|---|
| DE | 19502568 C1 | 7/1996 |
| DE | 19632186 A1 | 2/1997 |
| DE | 19850218 C1 | 3/2000 |
| DE | 10142303 A1 | 10/2002 |
| DE | 202005003009 U1 | 5/2005 |
| DE | 102006042999 B3 | 10/2007 |
| EP | 0724023 A1 | 7/1996 |
| EP | 1829986 A1 | 9/2007 |
| EP | 1892418 A2 | 2/2008 |
| EP | 2223955 A1 | 9/2010 |

OTHER PUBLICATIONS

"International Application No. PCT/EP2012/055473, International Preliminary Report on Patentability mailed Oct. 10, 2013", (w/ English Translation), 8 pgs.

"International Application No. PCT/EP2012/055473, Written Opinion mailed May 30, 2012", (English Translation), 5 pgs.

"German Application Serial No. 102011016611.4, Office Action mailed Jul. 8, 2014", (w/ English Translation), 14 pgs.

"German Application Serial No. 102011016611.4, Office Action dated Dec. 2, 2011", (w/ EnglishTranslation), 13 pgs.

"German Application Serial No. 102011016611.4, Response filed Feb. 20, 2012 to Office Action dated Dec. 2, 2011", (w/ English Translation of Amended Claims), 6 pgs.

* cited by examiner

SYSTEM OF SLIDING ELEMENTS

PRIORITY CLAIM TO RELATED APPLICATIONS

This application is a national stage application under 35 U.S.C. §371 of PCT/EP2012/055473, filed Mar. 28, 2012, and published as WO 2012/130865 A1 on Oct. 4, 2012, which claims priority to German Application No. 10 2011 016 611.4, filed Apr. 1, 2011, which applications and publication are incorporated by reference as if reproduced herein and made a part hereof in their entirety, and the benefit of priority of each of which is claimed herein.

The invention relates to systems of sliding elements which are formed by a base body and a counter-body. They can in this respect e.g. be sliding bearings, sliding guides, gears or other machine elements subject to tribological stress. A use can in this respect take place in dry running operation while dispensing with lubricants or using a single initial lubrication.

As a rule, in conventional systems of sliding elements, a greatly increased wear occurs in dry running operation or with slight lubrication, which results in a reduction in the service life.

Such systems of sliding elements should have a small coefficient of friction f and a small coefficient of wear k and this should be able to be achieved without any lubricant or with a small quantity of lubricant. In addition, in many applications the lightweight construction aspect has to be taken into account, as is the case in astronautics, for example. In aeronautics, astronautics or in clean rooms, a release of particles is also disadvantageous and therefore unwanted.

A toothed gear machine is known from EP 1 892 418 A2 in which a bearing bushing made from selected polymers, and in this respect inter alia from PTFE or from a fiberglass composite of the polymers named therein, and a shaft form a sliding bearing. The pure polymers and also the polymers in the fiberglass composite, however, have a low strength and are prone to distortion under applied forces and torques. This is amplified at elevated temperatures which may occur in operation, however. The effects of these disadvantages are reduced only insignificantly on a use of a simple fiber composite in which the relatively short fibers are distributed irregularly in a polymer matrix.

Since the fibers contained in the matrix also reach up the surface, the situation arises that fiber parts act abrasively on the sliding pairing and the wear is thus increased.

The tribological properties can be improved using solid lubricants which can be present in particle form distributed in a dispersed manner in the polymer matrix. However, a portion of solid lubricant of at least 10% by volume is required in the matrix for this purpose. Such a portion of solid lubricant, however, influences the mechanical properties to a substantial degree. In addition, the viscosity and the flow capability of the matrix is changed. This has the result that in the injection processes used with which the polymer is processed with the fibers, inhomogeneous distributions of solid lubricants can occur in the polymer matrix. In addition, the costs increase with the use of solid lubricants.

The shaft which is used in the sliding bearing known from EP 1 892 418 A2 and which is supported in the bearing bushing can in this respect be provided with a coating of diamond-like carbon to improve the friction conditions.

It is the object of the invention to provide a system of sliding elements comprising a base body and a counter-body which has a reduced mass with a sufficient strength and which achieves improved properties of friction and wear.

In accordance with the invention, this object is achieved by a system of sliding elements having the features of claim 1. Advantageous embodiments and further developments of the invention can be realized using features designated in subordinate claims.

The system of sliding elements in accordance with the invention is formed by a counter-body and a base body as a friction partner. In this respect, the base body is always formed from a fiber-reinforced polymer material in the formed of a textile-reinforced polymer matrix structure and the counter-body is coated with a diamond-like carbon (DLC) on the surface subject to friction.

The base body should be formed by a fabric, a knitted fabric, meshwork or a non-crimp fabric of carbon fibers and/or glass fibers, with carbon fibers and meshwork being preferred. The portion of fibers should amount to at least 50% with respect to the polymer matrix. This portion should also be observed in a counter-body which is likewise formed from a textile-reinforced polymer matrix structure. On use of a base body and counter-body having a textile-reinforced polymer matrix structure, the surface of the counter-body subject to friction should be directly provided with a coating of diamond-like carbon.

The diamond-like coating should have—a hardness of at least 4000 HV;—an elastic modulus of at least 400 GPa;—a mean roughness $R_z$ of less than 1 µm, preferably of less than 0.4 µm; and/or—a portion of hydrogen smaller than 0.5 At %. Such a layer is known, as is its manufacture, from EP 0 724 023 B1 and reference is made to its content in full.

The low mean roughness can be reached in the forming of the coating by using known filters in the relevant PVD processes in which arc discharges are used as a rule. Such filters are described, for example, in US 2007/0209934 A1 or in DE 198 50 218 C1. The problem of the so-called droplet formation in the coating can be avoided, but at least substantially reduced, with the filters. There is, however, also the possibility of carrying out a mechanical surface processing for reducing the surface roughness as is described in EP 1 829 986 B1.

The desired high hardness can in particular be reached by the extremely small portion of contained hydrogen. The coating should be formed by tetrahedrally bonded amorphous carbon (ta-C).

The counter-body can be formed from a metal or from a metal alloy. The metal or the metal alloy can take account of the required strength and optionally also of the desired thermal conductivity. A good heat dissipation is thus favorable since the base body, after all, has poor thermal conductivity.

At least one intermediate layer, which can achieve an improved adhesion of the coating and a barrier effect, can be formed between the surface of a metallic counter-body and the coating of diamond-like carbon. The selection of the material for adhesive-enhancing intermediate layers can take place while taking account of the thermal coefficients of expansion of the carbon and of the counter-body material. Suitable materials for intermediate layers are, for example, Ti, Zr, V, Nb, Ta, Cr, Mo or W.

The coating of diamond-like carbon should have a layer thickness in the range of 1 µm to 10 µm, preferably from 2 µm to 3 µm.

The fiber orientation of the textile-reinforced polymer matrix structure can be set as desired in the invention. In this respect, a parallel alignment with respect to the acting friction forces, that is in the sliding direction, is preferred. The system of sliding elements can thereby be integrated directly into the composite structure whose other design can be formed in derivation from other stress conditions.

Both duromer polymers such as epoxy resins, unsaturated polyester resins or phenol resins, but also thermoplastic polymers such as polyamides, polyacetates or polyetherketones can be used.

A base body and/or a counter-body can be manufactured from a plurality of mutually connected precursors. In this respect, the precursors can be connected to one another with material continuity by adhesive bonding or welding and each precursor can have different properties which take account of their arrangement at the respective body. The precursors can be manufactured in different forms and can in this respect have different textile reinforcement.

In the system of sliding elements in accordance with the invention, no incorporated, wear-reducing materials or coatings such as gel coats or lubricant varnish coatings are required.

The particularly hard coating on a counter-body is able to utilize wear particles which are, where applicable, abraded from the material of the base body for a self-lubricating effect. This is in particular the case on the use of carbon fibers. Such particles then do not act abrasively on both friction partners.

Not only the friction, but also the wear can be substantially reduced using the friction pairing which the base body and the counter-body form with the coating of diamond-like carbon, which can also be achieved without any lubricant in dry running operation.

The tribological conditions and also the wear can be further improved by the use of lubricant. It has been found that water or glycerin further improves the tribological conditions and the coefficient of friction μ can thereby be further reduced. However, other solid lubricants such as $MoS_2$ or graphite or lubricants having friction-reducing and wear-reducing additives can also be used. On a use of lubricant, a single initial lubrication for a number of applications is to be preferred.

The system of sliding elements in accordance with the invention can also be configured such that both the base body and the counter-body are coated with diamond-like carbon at tribologically stressed surfaces, as has already been described here for the counter-body coated in this manner.

The invention will be explained in more detail in the following with reference to examples.

Figure 2:
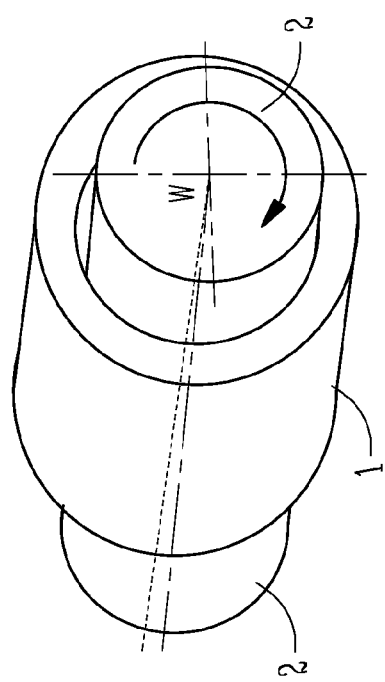
Figure 3:
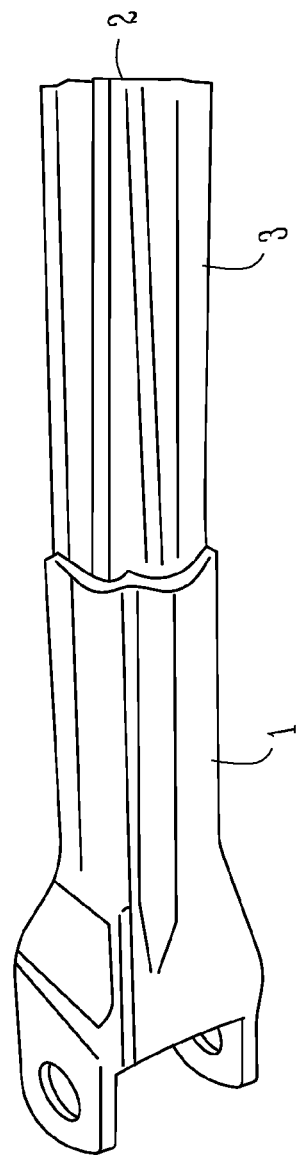
Figure 4:
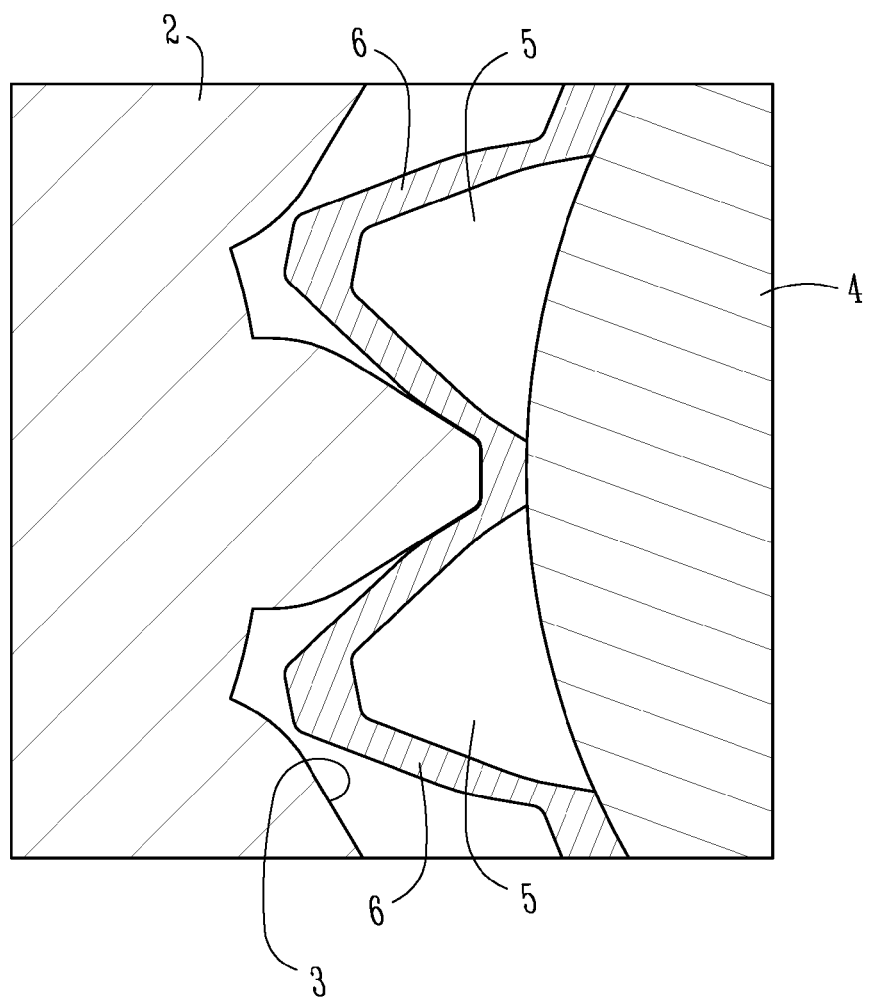

There are shown:

FIG. 1 an example for the manufacture of a joint as a system of sliding elements;

FIG. 2 a sliding bearing as a further example for a system of sliding elements in accordance with the invention;

FIG. 3 a shaft-hub connection as a further example in accordance with the invention; and FIG. 4 a toothed gear pairing as a further example in accordance with the invention.

In a first example, the manufacture of a joint having a thermoplastic composite structure will be explained in a plurality of steps as is illustrated by FIG. 1. The base body 1 is formed in this example from a textile-reinforced polymer matrix structure which is in turn manufactured using carbon fibers and polyetherketone (CF-PEEK). A thermal formability and a weldability are possible using this thermoplastic polymer.

The base body 1 is formed from textile-reinforced polymer at least in the region in which there is a contact with the counter-body 2. In this respect, a unidirectional carbon fiber non-crimp fabric (T700 fibers) is used. This non-crimp fabric is embedded in a PEEK matrix.

The counter-body 2, in this case an axle, comprises construction steel E295 and is coated with a coating of 4 μm thickness of diamond-like carbon between the two bands 2.1 formed in the outer marginal region.

The coating 3 had a hardness of 4500 HV and an elasticity modulus of 430 GPa. The mean roughness $R_z$ was 0.3 μm and the portion of hydrogen was less than 0.4 At %. The layer thickness was 3 μm.

The manufacture of the hinge joint takes place by thermoplastic reshaping. For this purpose, the region 2.2. to be deformed, which surrounds the axle 2 after completion, is heated to 270° C., which can be achieved with an infrared heater. After the insertion of the axle as a counter-body 2, this region is deformed so that the axle is surrounded by the base body 1. This can be achieved in an apparatus by form-matched joining using tubular forming.

Subsequently, a welding of the base body material takes place with material continuity so that the axle 2 is securely and fixedly surrounded. A hinge 7 can subsequently be mounted.

In FIG. 2, a second example is shown in the form of a sliding bearing. Here, a shaft as a counter-body 2 of ground steel (100Cr6) is coated at the whole surface with a coating 3 of diamond-like carbon. The coating 3 had a hardness of 5000 HV and an elasticity modulus of 500 GPa. The mean roughness $R_z$ was 0.2 μm and the portion of hydrogen was less than 0.3 At %. The layer thickness was 2 μm. The bearing bushing as a base body 1 comprises textile-reinforced epoxy resin.

The bearing bushing can be processed in a cutting process and can be manufactured from a tubular semifinished product. In this respect, the semifinished product can be clamped together with a winding mandrel into a cylindrical grinder and can then be worked to the desired outer diameter. After removing the winding mandrel, cutting to the desired length of the bearing bushing 1 can take place.

The semifinished product used for the bearing bushing as the base body 1 is of a graded structure and can be manufactured in a wet winding process in an CNC controlled winding machine. In this respect, a carbon fiber roving (Type T 700), which is stored on a bobbin, is drawn through an epoxy resin bath and applied to the winding mandrel. The impregnation of the roving strand takes place using cold-hardening epoxy resin of the type L 1000. The first three windings take place in the peripheral direction. The carbon fibers at the tribological contact surfaces lie in the preferred 0° direction, that is in the direction of the acting friction forces. The remaining portion of the bearing bushing 1 is formed with ten ±45° windings. The base body 1 with the winding mandrel is temperature treated at a temperature of 60° C. over a period of 6 h up to the hardening of the epoxy resin and can subsequently be end-processed in a cutting procedure.

The sliding bearing thus obtained was tested on a bearing test bench at a sliding speed of 0.3 m/s at a normal force of 100 N in a dry running operation.

The installed bearing play between the bearing bushing 1 and the shaft 2 was 0.4% of the shaft diameter.

In this respect, a coefficient of sliding friction f=0.33 and a coefficient of wear k=$1.2*10^{-7}$ mm$^3$/Nm was able to be determined. No wear could be found on the shaft 2 provided with the coating 3.

A third example, such as is shown in FIG. 3, is a shaft-hub connection which has a balancing function and is thus subject to tribological stress. The base body 1 is in this respect a gimbal joint coupling and the counter-body 2 is a splined shaft, in each case made from textile-reinforced epoxy resin. The counter-body is formed with a coating 3 of diamond-like carbon. The coating 3 had a hardness of 4100 HV and an elasticity modulus of 410 GPa. The mean roughness $R_z$ was 0.3 μm and the portion of hydrogen was less than 0.4 At %. The layer thickness was 4 μm.

The base body 1 and the counter-body 2 are manufactured by means of an injection process which is called an RTM technique. Meshwork of carbon fibers (T 700 rovings) are inserted into a molding tool of aluminum as a preform and the epoxy resin of the type RTM6 is injected. The inner contour of the base body 1 is manufactured with the aid of the hose blowing technique.

A fourth example is shown in FIG. 4. It is a straight-toothed toothed gear pairing having a standardized involute toothing. The smaller toothed gear (cog) forms the counter-body 2 and comprises aluminum. The larger toothed gear is the base body 1 which is formed from textile-reinforced epoxy resin. The outer layer which is subject to friction can in this respect be modified by a PTFE powder to achieve an additional friction reduction.

The toothed gear 2 is manufactured from AlCuMg1, 3.1325. The number of teeth $z_1$ is 23; the module m=14 mm; the tooth width b=178 mm. The manufacture can be achieved by gear hobbing. Its tribologically stressed surfaces are provided with a coating 3. The coating of diamond-like carbon had a hardness of 6000 HV and an elasticity modulus of 550 GPa. The mean roughness $R_z$ was 0.2 μm and the portion of hydrogen was less than 0.3 At %. The layer thickness was 3 μm.

The larger toothed gear as the base body 1 had a number of teeth $z_2$=81; a modulus m=14 mm; and a tooth width b=175 mm. It is manufactured using a plurality of precursors 4, 5 and 6. The actual toothed gear body is formed by a precursor 4 which is a preform of a plurality of layers of carbon fiber meshwork (Type T 700) with epoxy resin of the type RTM6. In accordance with the number of teeth 81, pultruded, carbon fiber reinforced epoxy resin sections as precursors 5 are fastened with material continuity using an adhesive on this toothed gear body with the aid of an apparatus. The pultrusion section approximately corresponds to the tooth contour of the teeth. Braided hoses of carbon fibers (Type 700) are draped as a precursor 6 over this intermediate product formed by the two precursors 4 and 5. The outer braided hoses can be modified with PTFE powder for further friction reduction.

The preform thus obtained can then be further processed by means of an injection process which is called an RTM technique. In this respect, epoxy resin is injected into a mold tool at elevated pressure and epoxy resin is injected and infiltrated with an applied vacuum. The contour of the base body 1 can be manufactured with the aid of the hose-blowing technique.

The toothed gear forming the base body 1 can be cut to the desired width by abrasive cutting.

The obtained toothed gear pairing is characterized by a high functionality, an absolute freedom from maintenance and a high damping capability. The mass is above all substantially reduced with respect to conventional toothed gear pairings having equivalent strength so that the lightweight construction effect is taken into account as much as possible. The mass can be reduced to 34% for the cog (counter-body 2) and the larger toothed gear (base body 1) to 20% in comparison with toothed gears of steel.

The use of aluminum is also possible in this application by a coating 3 of diamond-like carbon, which was previously not possible in applications for toothed gears and sliding bearings. The good thermal conductivity of aluminum also has an advantageous effect in this respect. The thermal conductivity of aluminum is 226 W/mk and the thermal conductivity of the diamond-like carbon is 2 W/mK.

The invention claimed is:

1. A system of sliding elements, comprising:
a counter-body and a base body acting as friction partners,
wherein the base body is formed from a fiber reinforced polymer material and the counter-body comprises a textile reinforced polymer matrix structure that is directly provided with a coating of diamond-like carbon at a surface subject to friction,
wherein at least the base body is formed from a textile reinforced thermoplastic polymer matrix structure, and
wherein at least a portion of the base body is formed from a fabric, a knitted fabric, meshwork, or a non-crimp fabric formed from at least one of carbon fibers and glass fibers, wherein the portion of fibers comprises at least 50% by volume with respect to the polymer matrix.

2. The system of sliding elements in accordance with claim 1, wherein the diamond-like coating has at least one of:
a hardness of at least 4000 HV;
an elasticity modulus of at least 400 GPa;
a mean roughness $R_z$ of less than 1 μm; and
a hydrogen content less than 0.5 At %.

3. The system of sliding elements in accordance with claim 1, wherein the counter-body is formed from a metal or a metal alloy.

4. The system of sliding elements in accordance with claim 3, wherein the counter-body further comprises at least one intermediate layer formed between the surface of the counter-body and the coating of diamond-like carbon.

5. The system of sliding elements in accordance with claim 1, wherein the coating of diamond-like carbon has a layer thickness of 1 μm to 10 μm.

6. The system of sliding elements in accordance with claim 1, wherein at least one friction-reducing lubricant is contained in the matrix.

7. The system of sliding elements in accordance with claim 6, wherein the at least one friction-reducing lubricant comprises at least one of PTFE, $MoS_2$, and graphite.

8. The system of sliding elements in accordance with claim 1, wherein at least one of the base body and the counter-body is manufactured from mutually connected precursors.

9. The system of sliding elements in accordance with claim 1, wherein the base body and the counter-body are coated at tribologically stressed surfaces with a coating of diamond-like carbon.

10. A system of sliding elements, comprising:
a base body comprising a fiber reinforced polymer material formed with a thermoplastic polymer as a matrix system;
at least one friction-reducing lubricant contained in the matrix;
a counter-body formed from a metal or a metal alloy or comprising a textile reinforced polymer matrix structure, the counter-body including a surface subject to friction is directly provided with a coating of diamond-like carbon having a layer thickness of 1 μm to 10 μm;
wherein the base body and the counter-body act as friction partners;
wherein at least the base body is formed from a textile reinforced polymer matrix structure comprising at least one of a fabric, a knitted fabric, meshwork, and a non-crimp fabric formed from at least one of carbon fibers and glass fibers, wherein the portion of fibers comprises at least 50% by volume with respect to the polymer matrix; and
wherein the diamond-like coating has at least one of: a hardness of at least 4000 HV; an elasticity modulus of at least 400 GPa; a mean roughness $R_z$ of less than 1 μm; and a hydrogen content less than 0.5 At %.

11. The system of sliding elements in accordance with claim 10, wherein at least one of the base body and the counter-body is manufactured from mutually connected precursors.

12. The system of sliding elements in accordance with claim 10, wherein the base body and the counter-body are coated at tribologically stressed surfaces with a coating of diamond-like carbon.

* * * * *